United States Patent [19]
Kubo et al.

[11] Patent Number: 4,816,930
[45] Date of Patent: Mar. 28, 1989

[54] TRACKING CONTROL FOR A TAPE USING PILOT SIGNALS

[75] Inventors: Kanji Kubo, Hirakata; Naoshi Usuki, Kadoma; Hiroshi Taniguchi, Hirakata; Mitsunobu Furumoto, Yao, all of Japan

[73] Assignee: Matsushita Electric Industrial Co., Ltd., Osaka, Japan

[21] Appl. No.: 889,926

[22] Filed: Jul. 28, 1986

[30] Foreign Application Priority Data

Jul. 30, 1985 [JP] Japan ................. 60-167914
Jul. 30, 1985 [JP] Japan ................. 60-167938

[51] Int. Cl.$^4$ ........................... G11B 5/584
[52] U.S. Cl. ................. 360/10.2; 360/73.05; 360/77.14
[58] Field of Search ............ 360/77, 10.2, 10.3, 360/18, 27, 73, 75, 10.1

[56] References Cited

U.S. PATENT DOCUMENTS

| | | | |
|---|---|---|---|
| 4,587,580 | 5/1986 | Takayama et al. | 360/77 |
| 4,594,615 | 6/1986 | Nemoto et al. | 360/77 |
| 4,630,146 | 12/1986 | Takayama et al. | 360/77 |
| 4,658,309 | 4/1987 | Yasuda et al. | 360/77 |

*Primary Examiner*—Alan Faber
*Assistant Examiner*—Steven R. Garland
*Attorney, Agent, or Firm*—Spencer & Frank

[57] ABSTRACT

A circuit for reproducing informaiton signals and four different tracking control pilot signals recorded on respective tracks on a magnetic tape and producing from the pilot signals a tracking error signal indicative of a relative positional deviation between each of a plurality of magnetic heads and each track of the tape. The circuit includes a balanced modulation circuit for successively multiplying reproductions of the pilot signals and a reference signal to produce a multiplication output signal having components corresponding to the respective pilot signals. Respective tuning circuits derive first and second signals from the multiplication output signal, having different frequency components and corresponding to different ones of the pilot signals. A level comparison circuit compares the first and second signals in level to produce a level-compared output signal whose value is indicative of the relative levels of the first and second signals, the level-compared output signal having respective portions corresponding to successive periods of reproducing signals on tracks on which different ones of the pilot signals are recorded. A further portion of this circuit time-divisionally extracts the values of levels of the level-compared output signal. A further comparator calculates the values of the differences between at least two of the extracted level values to produce the tracking error signal. The circuitry eliminates any variations in the tracking error signal which may be caused by any variations in mechanical height of the magnetic heads.

4 Claims, 17 Drawing Sheets (a) H.SW (b) $f_H$ (c) $3f_H$ (d) LEVEL COMPARISON CIRCUIT OUTPUT (e) TRACKING ERROR SIGNAL (a) H.SW (b) $f_H$ (c) $3f_H$ (d) LEVEL COMPARISON CIRCUIT OUTPUT — $\frac{1}{2}V_{cc}$ (e) TRACKING ERROR SIGNAL — $\frac{1}{2}V_{cc}$, 601

(a) H.SW (b) fH (c) 3fH (d) LEVEL COMPARISON CIRCUIT OUTPUT (e) TRACKING ERROR SIGNAL (f) H.SW
(g) DETECTED & RECTIFIED OUTPUT
(h) DETECTED & RECTIFIED OUTPUT
(i) DETECTED & RECTIFIED OUTPUT (j) H.SW
(k) DETECTED & RECTIFIED OUTPUT
(L) DETECTED & RECTIFIED OUTPUT
(m) DETECTED & RECTIFIED OUTPUT

TRACKING CONTROL FOR A TAPE USING PILOT SIGNALS

BACKGROUND OF THE INVENTION

The present invention relates to magnetic recording and reproducing apparatus (hereinafter referred to as VTRs) and more particularly to a method of producing a tracking error signal when performing the tracking control by the use of four different pilot signals.

A tracking error signal producing method which has heretofore been used will now be described.

FIG. 1 shows a magnetization pattern of four different recorded pilot signals. In the Figure, symbols $A_1$, $B_1$, $A_2$, —, —designate recording tracks recorded by A and B heads of different azimuth angles, and $f_1$ to $f_4$ pilot signals. The frequencies of the pilot signals are selected to have values of 6.5 $f_H$ to 10.5 $f_H$ as shown in the Figure if $f_H$ represents the frequency of the horizontal synchronizing signal in the video signal. The pilot signals are sequentially and cyclically switched on every field so as to be superposed on information signals for recording. With the pilot signals recorded on the respective tracks, the frequency difference between the tracks is either $f_H$ or $3f_H$. Thus, by using the method which will be described later, it is possible to extract the frequency components $f_H$ and $3f_H$ and compare their levels thereby utilizing the resulting signal as a tracking error signal.

In FIG. 1, numeral 101 designates the magnetic head, 102 the scanning direction of the magnetic head, and numeral designates 103 the direction of movement of the magnetic tape.

FIG. 2 is a block diagram showing a processing circuit for producing a tracking error signal. In the Figure, the reproduced pilot signal is applied through a terminal 201. For example, when the scanning position of the head is the one shown in FIG. 1, the reproduced pilot signal is a composite signal of $f_2$, $f_3$ and $f_4$. A balanced modulation circuit 202 multiplies a reference signal introduced through a terminal 203 and the reproduced pilot signal. The reference signal has the same frequency component as the pilot signal recorded on the main track scanned by the head and it has the frequency $f_3$ in the case of the head scanning shown in FIG. 1. The output signals of the balanced modulation circuit 202 are the sum and difference signals of the reference signal and the reproduced pilot signal and the difference signal is extracted by an $f_H$ tuning circuit 204 and a $3f_H$ tuning circuit 205. Numerals 206 and 207 designate detector and rectifier circuits and numeral 208 designates a level comparison circuit. The output level of the level comparison circuit 208 varies depending on the difference in level between the $f_H$ and $3f_H$ signals and thus it can be used as a tracking error signal. Numeral 209 designates an analog inverter circuit and numeral 210 designates an analog switch. In response to a head switching signal (hereinafter referred to as an H.SW signal) applied through a terminal 211, the analog switch 210 is switched so as to generate inverted and uninverted signals. Here, the H.SW signal is a rectangular signal having a frame period (30 Hz in the NTSC system) and synchronized with the rotation phase of the magnetic heads. The reason for alternately generating the inverted and uninverted signals for every field is to cause the track deviation direction of the magnetic head and the varying direction of the tracking error signal to always coincide with each other. For example, there is a difference in the varying direction of the $f_H$ and $3f_H$ signals with respect to the deviation of the head in the same direction between the case where the head scans an Ai track (i=1, 2, 3, —, —) and the case where the head scans a Bi track and therefore the polarity of the signal must be reversed every field.

The tracking error signal generated at a terminal 212 is supplied to a capstan control system. The capstan control system utilizes the tracking error signal to control the driving phase of the magnetic tape in such a manner that the magnetic head follows and scans the recording track for reproduction.

The waveforms generated at various parts in the circuit block diagram shown in FIG. 2 will now be described.

FIG. 3 shows the relative positions of A magnetic head 301 and B magnetic head 302 and the recording tracks when the former are following or on-track and scanning the latter for reproduction and FIG. 4 shows the resulting signal waveforms.

Shown in (a) of FIG. 4 is the H.SW signal and $A_1$, $B_1$, —, —show time periods in which the tracks $A_1$, $B_1$, —, —shown in FIG. 3 are respectively scanned for reproduction. Shown in (b) of FIG. 4 is the output signal of the $f_H$ tuning circuit 204 and (c) the output signal of the $3f_H$ tuning circuit 205. In the on-track condition, the reproduced levels of the $f_H$ and $3f_H$ signals are the same. Shown in (d) is the output level of the level comparison circuit 208. In the on-track condition, this output level has for example a value of ½ Vcc (Vcc is the supply voltage). Shown in (e) is the tracking error signal generated at the terminal 212. The inverting circuit 209 inverts the level variation with respect to the ½ Vcc and therefore the signals (d) and (e) become equal to each other in the on-track condition.

FIG. 5 shows a condition in which the heads are deviated from the respective tracks to the left on the paper plane and FIG. 6 shows the resulting waveforms at the various parts. As shown in the Figure, the $f_H$ signal component is smaller than the $3f_H$ signal component during the scanning period of the A head and the reverse relation takes place during the scanning period of the B head. As a result, the output (d) of the level comparison circuit has a rectangular waveform on both sides of ½ Vcc as shown in the Figure. Here, the waveform is drawn on the assumption that the output of the level comparison circuit goes high when the level of $f_H$ is greater than the level of $3f_H$. If the polarity of the output of the level comparison circuit generated during the scanning periods of the B head is inverted with respect to the ½ Vcc, the resulting tracking error signal becomes as shown in (e) of FIG. 6 and a level variation 601 from the ½ Vcc corresponds to the track deviation.

Next, a description will be made of the waveforms generated at the various parts when the A head and the B head are different in height.

The head heights of the A and B heads are adjusted so as to become the same from the reference plane perpendicular to the rotation axes. In fact, however, there occurs an adjustment error. This head height adjustment error is equivalent to the fact that one head relatively deviates in the width direction of the recording track on the basis of the other head. FIG. 7 shows the relative positional relation obtained when the normal recording tracks recorded by the heads involving no head height difference are reproduced by the heads involving such head height difference. With the heads involving the head height difference, the control system is stabilized with the head positions shown in FIG. 7 as will be described later in detail.

FIG. 8 shows the respective signals generated in response to the head positions shown in FIG. 7. In FIG. 8, the solid lines show the signals generated in response to the head positions shown in FIG. 7 and the broken lines show the signals generated in response to the heads deviated in the directions of arrows 701 and 702, respectively, from the head positions shown in FIG. 7.

The signals shown by the solid lines will be described first.

With the head positions shown in FIG. 7, the signal including the $f_H$ frequency component is always at the low level and the $3f_H$ component is always at the high level during the scanning periods of the A and B heads. As a result, the output of the level comparison circuit varies as shown by the solid line in (d) of FIG. 8 and the tracking error signal inverted during the scanning periods of the B head becomes as shown by the solid line in (e) of FIG. 8. The tracking error signal is sent to the capstan control system through a low-pass filter so that its average level becomes ½ Vcc and the control system is stabilized in this condition. Thus, it can be said that the head positions shown in FIG. 7 represent stable positions.

Next, a description will be made of the signals generated in response to the deviation of the heads of FIG. 7 in the directions of the arrows 701 and 702. In this case, the signals become as shown by the broken lines in FIG. 8. In other words, the $f_H$ component signal is decreased further and conversely the $3f_H$ component signal is increased during the scanning periods of the A head. During the scanning periods of the B head, conversely the $f_H$ component signal is increased and the $3f_H$ component signal is decreased. Thus, the output signal of the level comparison circuit becomes as shown by the broken line in (d) of FIG. 8. On the other hand, the tracking error signal obtained by inverting the polarity of the signal with respect to the ½ Vcc level during the scanning periods of the B head becomes as shown by the solid line in (e) of FIG. 8.

As will be seen from the foregoing description, the voltage variation corresponding to the track deviations takes the form of a level variation 801 between the signals generated during the scanning periods of the heads in the case of the output of the level comparison circuit, while in the case of the tracking error signal, it takes the form of a differential voltage 802 between the average DC potential of the tracking error signal level variations and the ½ Vcc potential. On the other hand, the voltage variation due to the head height difference is such that it appears as a differential voltage 803 between the average DC potential of the output signal and the ½ Vcc potential in the case of the output of the level comparison circuit and it appears as a tracking error signal level variation 804 in the case of the tracking error signal.

The level variation 804 shown in (e) of FIG. 8 is not completely removed by its passage through the low-pass filter and there remains a variation component of the H.SW period. This results in a variation in the rotation speed of the capstan motor thus causing problems including a picture flagging, etc.

SUMMARY OF THE INVENTION

It is an object of the present invention to provide a tracking error signal involving no level variation even in cases using a plurality of heads having different head heights.

Thus, in accordance with the invention, the above object is accomplished by separating the pilot signals recorded on adjacent ones of tracks scanned by A and B heads into $f_H$ and $3f_H$ frequency components for level comparison, sampling and holding the signals produced by the level comparison during the scanning periods of the heads to generate the corresponding signal levels and utilizing the difference in level between the signals as a tracking error signal.

The above object is also accomplished by another method of the invention comprising separating the pilot signals recorded on adjacent ones of tracks scanned by A and B heads into $f_H$ and $3f_H$ frequency components, detecting and rectifying the separated signals, applying a given bias voltage to each of the detected and rectified signals to compare the levels of the signals after the bias voltage application, extracting by time division the signals subjected to the level comparison during the scanning periods of the heads and varying the bias voltage by means of the average DC voltage of the extracted signals.

DESCRIPTION OF THE PREFERRED EMBODIMENTS

Figure 1:
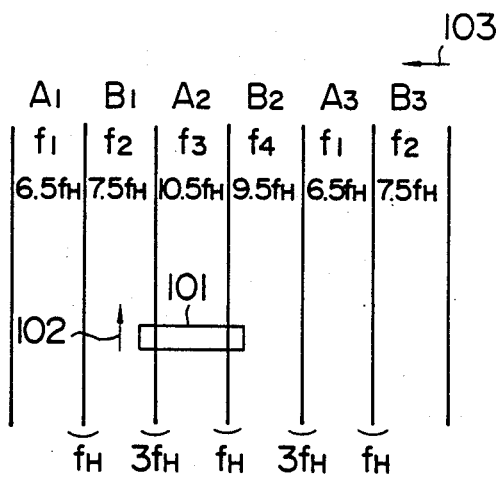
FIG. 1 is a diagram showing a recorded magnetization pattern of pilot signals.
Figure 3:
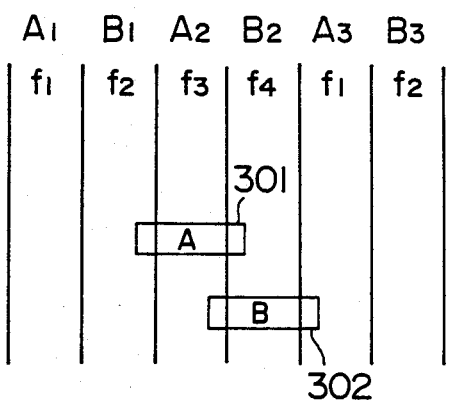
FIG. 3 is a diagram showing the arrangement of heads in an on-track condition.
Figure 2:
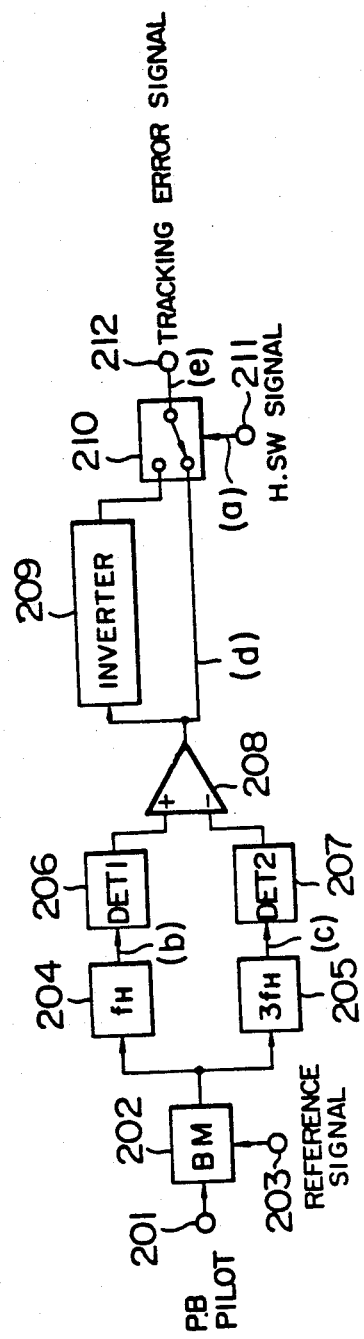
FIG. 2 is a block diagram of a conventional circuit for producing a tracking error signal.
Figure 4:
FIG. 4, parts (a)–(e), illustrate the signal waveforms generated at various parts of FIG. 1 in the condition shown in FIG. 3.
Figure 4:
Figure 4:
Figure 4:
Figure 4:
Figure 5:
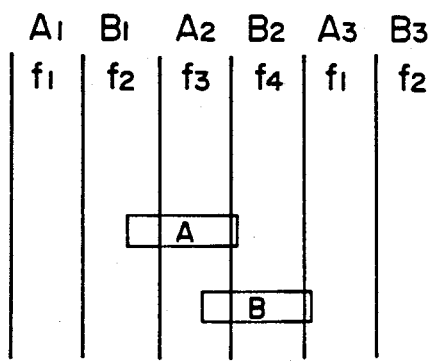
FIG. 5 is a diagram showing the arrangement of the heads in a mistrack or deviation condition.
Figure 9:
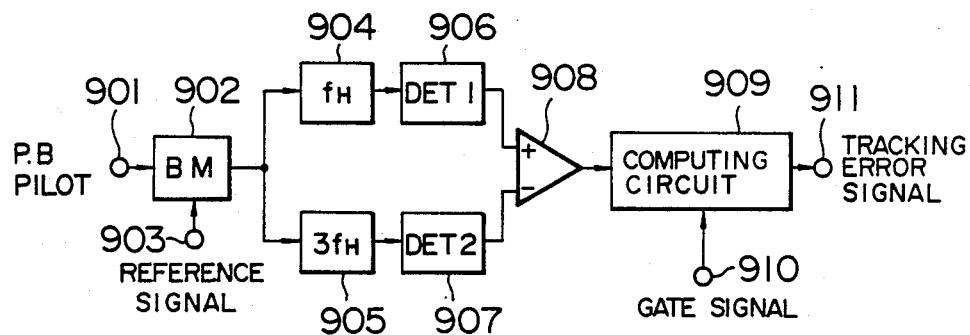
FIG. 9 is a block diagram showing a first embodiment of the invention.

FIG. 9 illustrates a first embodiment of the invention. The reproduced pilot signal is applied through a terminal 901 and a reference signal is applied through a terminal 903. Numeral 902 designates a balanced modulation circuit, 904 an $f_H$ tuning circuit, 905 a $3f_H$ tuning circuit, 906 and 907 detector and rectifier circuits, and 908 a level comparison circuit. The signals 901 and 903 and the circuits 902 to 908 are the same in operation with those described in connection with FIG. 2. Numeral 909 designates a computing circuit for generating the output of the level comparison circuit at a position synchronized in phase with a gate signal applied through a terminal 910 and obtaining the difference in level between the signals generated during the scanning periods of A and B heads to generate it as a tracking error signal.

A detailed circuit construction of the computing circuit 909 will now be described.

Figure 6:
FIG. 6 parts (a)–(e), illustrate the signal waveforms generated at the various parts in the condition shown in FIG. 5.
Figure 6:
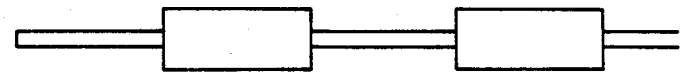
Figure 6:
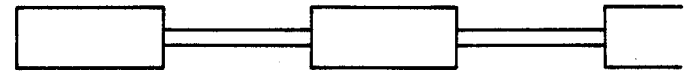
Figure 6:
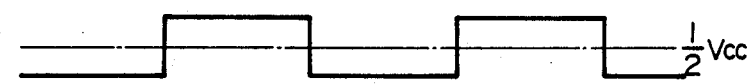
Figure 6:
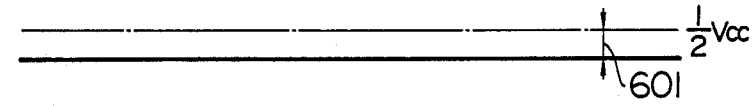
Figure 10:
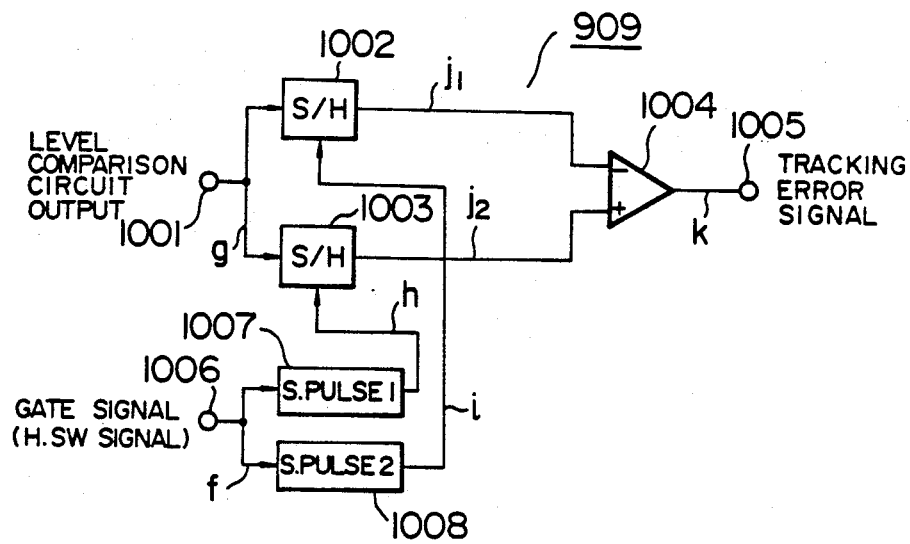
FIG. 10 is a block diagram showing a detailed construction of the computing circuit.
Figure 11:
FIG. 11, parts (f)–(k), illustrate the signal waveforms generated at various parts in FIG. 10.
Figure 11:
Figure 11:
Figure 11:
Figure 11:
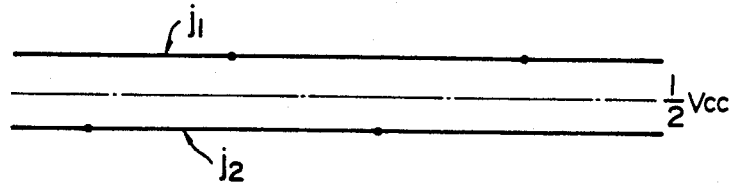
Figure 11:
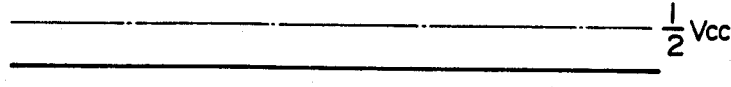

FIG. 10 shows a detailed circuit construction of the computing circuit and FIG. 11 shows the signal waveforms generated at various parts in FIG. 10. In FIG. 10, an output signal (g) from the level comparison circuit is applied through a terminal 1001. In this embodiment, it corresponds to the level comparison circuit output shown in (d) of FIG. 6. Numerals 1002 and 1003 designate sample-and-hold circuits. Numerals 1007 and 1008 designate sampling pulse generating circuit for respectively producing sampling pulses shown in (h) and (i) of FIG. 11 from a gate signal (f) applied through a terminal 1006. The resulting sampled and held signals (j$_1$) and (j$_2$) are applied to a subtracting circuit 1004. The subtracting circuit 1004 generates a potential of ½ Vcc when the input signals are equal and generates an output consisting of the ½ Vcc level plus or minus the level difference between the input signals when the input signals are different. In this case, the tracking error signal shown in (k) of FIG. 11 is indicated in the form of (j$_2$) minus (j$_1$). The signal shown (k) of FIG. 11 is the same with the signal shown in (e) of FIG. 6 and there will be no problem if a tracking error signal is produced by the circuit construction shown in FIG. 10.

Figure 8:
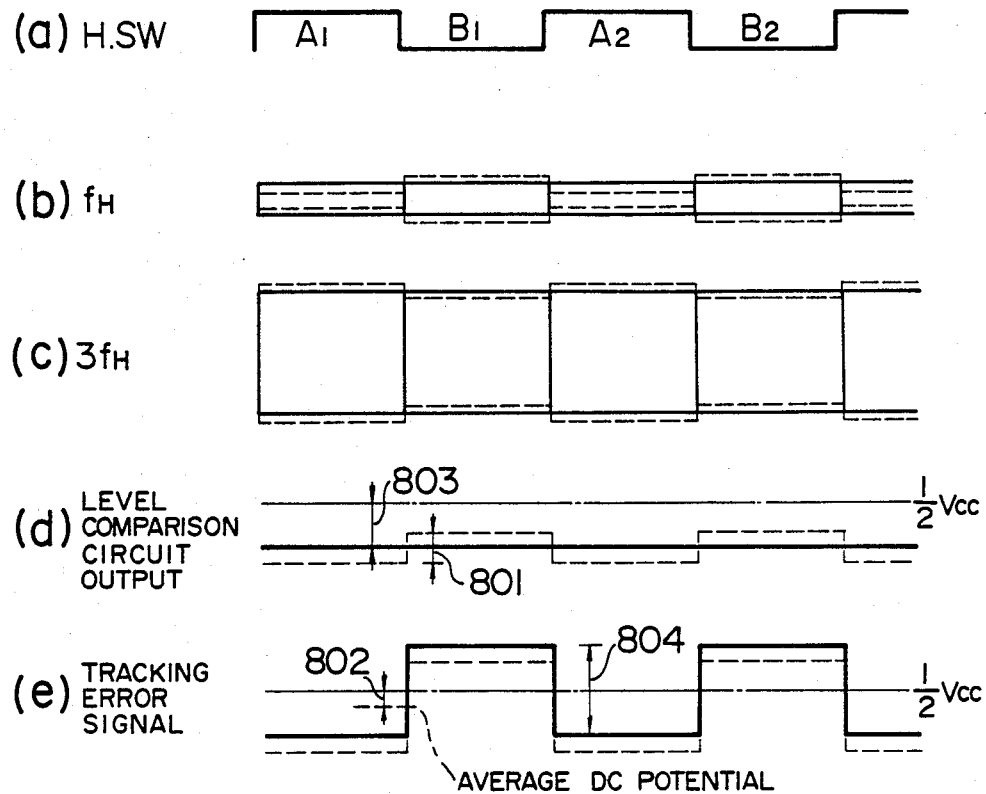
FIG. 8 illustrate parts (a)–(e), the signal waveforms generated at the various parts in the condition shown in FIG. 7.

Next, a description will be made of the production of a tracking error signal when the heads are different in head height. In this case, the level comparison circuit output corresponds for example to the signal shown by the solid line in (d) of FIG. 8 as explained previously. When the signal (d) is sampled and held during the scanning periods of the A and B heads, the resulting held signals are the same in level. Thus, the output of the computing circuit 1004 shown in FIG. 10 becomes ½ Vcc and a tracking error signal having no level variation is generated.

The computing circuit 909 shown in FIG. 9 may be formed with a microcomputer and its embodiment will now be described.

Figure 12:
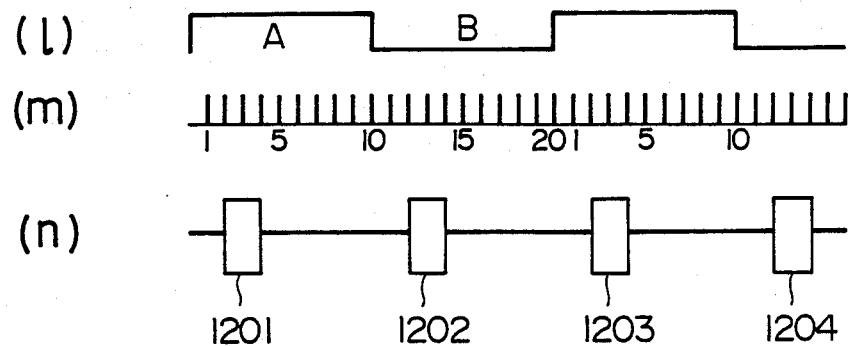
FIG. 12, parts (l)–(n), illustrate a plurality of signal waveforms useful for explaining the computational operations of the microcomputer.

FIG. 12 illustrates signal waveforms for explaining the software processing that will be described later with (l) showing an H.SW signal, (m) a timing of timer interrupts and the number of interrupts and (n) an example of the reproduction of PCM signals.

The software processing may be described with reference to FIGS. 13 and 14.

Figure 13:
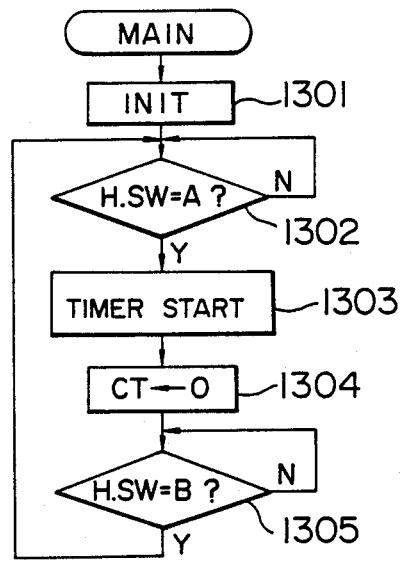
FIG. 13 is a flow chart showing a main routine used when the invention is applied to a two head type VTR.

FIG. 13 is a flow chart showing the processing steps of a main routine. In the Figure, a step 1301 is an initializing step for performing the clearing of the RAMs, the setting of an initial value of a tracking error signal, etc. At a step 1302, a decision is made so that a step 1303 and the following are performed if the H.SW signal is at the A head scanning period and the processing is placed in a wait state otherwise. The step 1303 is in fact performed upon the transition of the H.SW signal from the A head scanning period to the B head scanning period. The step 1303 is a step for starting the internal timer. While the timer time may be selected arbitrarily, it is selected so that each frame is divided into 20 parts as shown in (m) of FIG. 12. At a step 1304, the RAM designated as CT is cleared. At a step 1305, the processing is placed in a wait state until the H.SW signal changes to the scanning period of the B head and a transfer is made to the step 1302 upon reaching the B head scanning period. These steps comprise the main routine.

Figure 14:
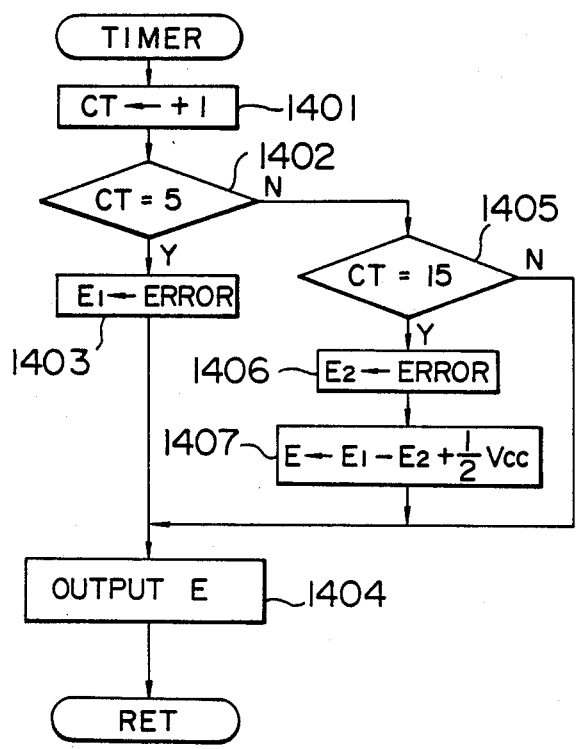
FIG. 14 is a flow chart showing a timer interruption routine used along with the main routine of FIG. 13.

When a timer interrupt is caused during the execution of the main routine, the interrupt routine shown in FIG. 14 is executed. In the Figure, at a step 1401, the content of the RAM designated as CT is increased by 1. Since the value of CT is increased by 1 each time a timer interrupt is produced, the CT stores the number of occurrence of timer interrupts. At a step 1402, a decision is made so that a transfer is made to a step 1403 if the value of CT is 5 and a transfer is made to a step 1405 otherwise. At the step 1403, the output of the level comparison circuit at this time is read and stored in the RAM designated as $E_1$. At a step 1404, the value of the RAM or E storing the tracking error signal is generated. At the beginning, e.g., at the time of connection of the power source, the initial value set at the step 1301 (FIG. 13) is generated. If the value of CT is not 5, the step 1405 is performed. If the value of CT is 15, a transfer is made to a step 1406. If the value of CT is not 15, the step 1404 is performed. At a step 1406, the output of the level comparison circuit at this time is read and stored in the RAM designated as $E_2$. At a step 1407, the value of $\frac{1}{2}$ Vcc is added to the difference between the values of $E_1$ and $E_2$ and the sum is stored in the RAM designated as E. In other words, at the step 1407, the tracking error signal is renewed. After the completion of the step 1407, the step 1404 is performed and the new tracking error signal is generated.

The values 5 and 15 shown at the steps 1402 and 1405 indicate the sampling positions. As will be seen from FIG. 12, the positions of the CT values of 5 and 15 are selected to be at the centers of the scanning periods of the heads and therefore these values of CT are proper in the case of the ordinary VTR used for the recording and reproduction of video signals. In the case of an 8 mm VTR, however, it is conceivable to divide the video signal recording track area into five parts and record and reproduce only time-compressed PCM audio signals. In this case, the reproduced PCM signals are obtained for example only at portions designated by numerals 1201 to 1204 in (n) of FIG. 12. Thus, the output signal of the level comparison circuit attains the normal values only at these portions. In the case of a VTR which records and reproduces only such PCM signals, in accordance with the invention it is only necessary to change the condition values of 5 and 15 at the steps 1402 and 1405, respectively. In the case shown in FIG. 12, for example, it is only necessary to select the values of 3 and 13.

An example of the application of the invention to a four head type VTR employing a small-diameter cylinder will now be described.

Figure 17:
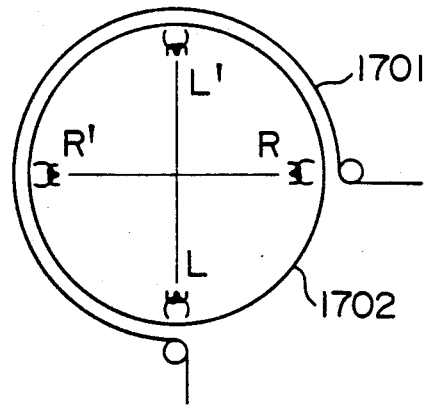
FIG. 17 is a plan view showing the head arrangement of the four head type VTR.

FIG. 17 shows the arrangement of the heads and the lap amount of the tape on the four head type cylinder. In the Figure, symbols R, R' and L, L' designate the heads having different azimuth angles and the heads are arranged at intervals of 90 degrees as shown in the Figure. A magnetic tape 1701 is wrapped about 270 degrees on the rotary cylinder 1702. It is well known that this four head type construction has the advantage of reducing the cylinder diameter as compared with the two head type cylinder.

Figure 18:
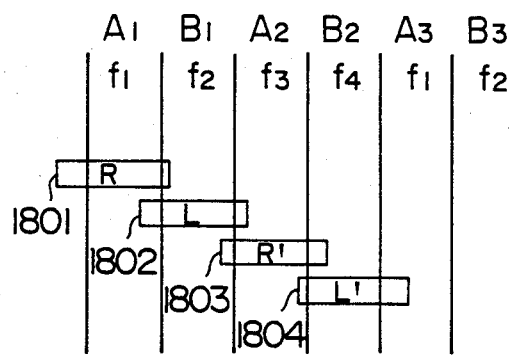
FIG. 18 is a diagram showing the relation between the head height differences caused in the four head type VTR and the recording tracks.
Figure 19:
FIG. 19, parts (a)–(e), illustrate the signal waveforms generated at various parts in the tracking error signal processing circuit in the condition shown in FIG. 18.
Figure 19:
Figure 19:
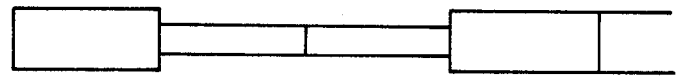
Figure 19:
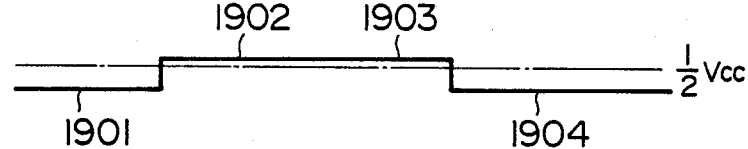
Figure 19:

With the four head type VTR, there are variations in head height among the heads. The relation between the head positions and the recording tracks in such a case are shown in FIG. 18 and FIG. 19 shows the signal waveforms generated by the respective circuits in the condition of FIG. 18. In FIG. 18, the heads designated at 1801 to 1804 represent the R, L, R' and L' heads and their positions relative to the recording tracks are shifted slightly. In this condition where the heads are different in height, the reproduced levels of the $f_H$ and $3f_H$ components have the waveforms shown in (b) and (c) of FIG. 19. Thus, the output of the level comparison circuit and the tracking error signal according to the conventional method have signal waveforms as shown in (d) and (e) of FIG. 19. As will be seen from these waveforms, the differences in the height of the heads result in a variation of the tracking error signal level. It is to be noted that the average value of the tracking error signal shown in (e) is $\frac{1}{2}$ Vcc and therefore the control system is stabilized in this condition.

In accordance with the invention, the value obtained by subtraction of the levels during the head scanning periods is utilized as a tracking error signal and therefore it is only necessary to apply the similar concept to the four head type VTR. In the case of the signal shown in (d) of FIG. 19, for example, it is necessary to effect the subtraction among the values shown at 1901 to 1904 and utilize as a tracking error signal the value obtained by adding the value of $\frac{1}{2}$ Vcc to the value of $(1901)-(1902)+(1903)-(1904)$.

Next, a specific processing method for the four head type will be described.

Figure 15:
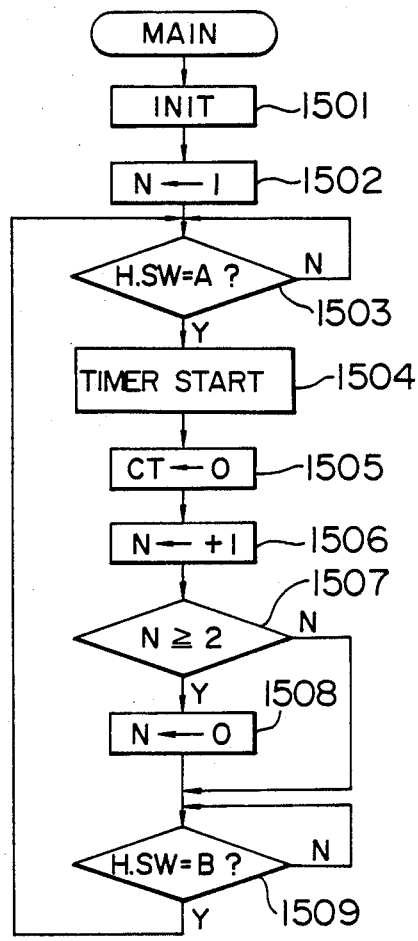
FIG. 15 is a flow chart showing a main routine used when the invention is applied to a four head type VTR.
Figure 16:
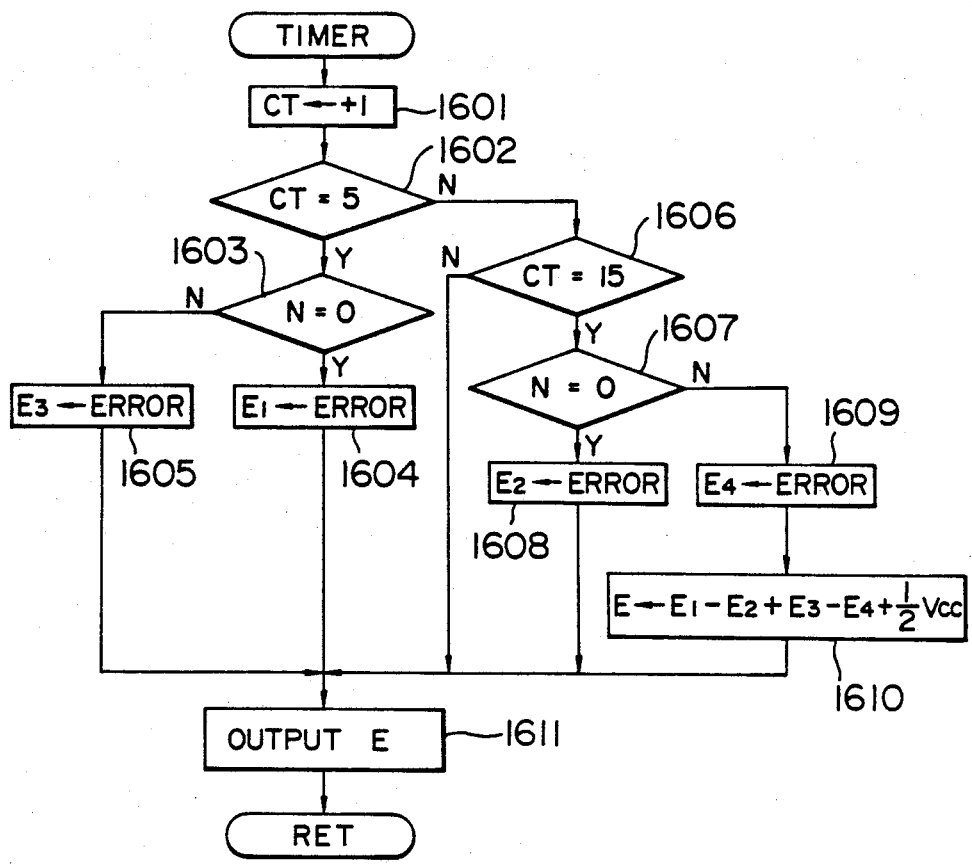
FIG. 16 is a flow chart showing a timer interruption routine used along with the main routine of FIG. 15.

FIG. 15 shows the processing steps of a main routine used when the invention is applied to the four head type VTR and FIG. 16 shows a timer interrupt routine.

In FIG. 15, at an initialize step 1501, the operation of clearing the RAMs, setting a tracking error signal initial value, etc., is performed. At a step 1502, the value of the RAM or N for counting the number of frames is set to 1. At a step 1503, a decision is made so that if a H.SW signal is at an A head scanning period, a step 1504 and the following are performed. At the step 1504, the timer is started. At a step 1505, the RAM designated as CT and adapted to count the number of timer interrupts is cleared. At a step 1506, the value of N is increased by 1. At a step 1507, a decision is made so that if the value of N is equal to or greater than 2, the value of N is reduced to zero at a step 1508. If the value of N is less than 2, a transfer is made to a step 1509. At the step 1509, it is determined whether the H.SW signal is at a B head scanning period. From the flow chart of FIG. 15 it will be seen that the value of N represents the frame period and it assumes the value of 0 or 1.

FIG. 16 shows the timer interrupt routine. In the Figure, at a step 1601, the CT is increased by 1 thereby storing the number of timer interrupts. At steps 1602 and 1606, the same operations as described in connection with FIG. 14 are performed. At steps 1603 and 1607, respectively, it is determined whether the processing is for the first frame or the second frame. If it is the first processing, a transfer is made to steps 1604 and 1608 so that the output values of the level comparison circuit during the head scanning periods are stored in the RAMs designated as $E_1$ and $E_2$, respectively. If it is the second processing, a transfer is made to steps 1605 and 1609 so that the output values of the level comparison circuit at the respective time instants are stored in the RAMs designated as $E_3$ and $E_4$. After the step 1609 has been performed, a transfer is made to a step 1610 where the computation of $E_1-E_2+E_3-E_4+\frac{1}{2}$ Vcc is effected by using the values in the $E_1$ to $E_4$ and the result of the computation is stored in the RAM designated as E for storing a tracking error signal value. At a step 1611, the tracking error signal is generated.

A second embodiment of the invention will now be described. The basic concept of the second embodiment will be described first.

Figure 20:
FIGS. 20, parts (f)–(i), and FIGS. 21, (j)–(m), are diagrams showing the relative levels of the detected and rectified signals.
Figure 20:
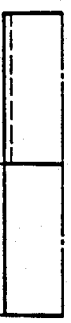
Figure 20:
Figure 20:
Figure 21:
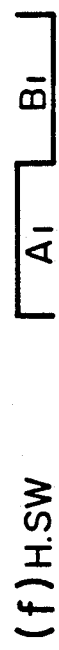
Figure 21:
Figure 21:
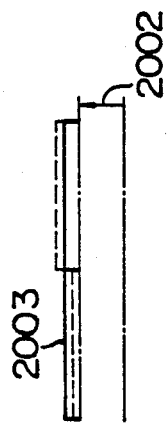
Figure 21:

FIGS. 20 and 21 show the levels of detected and rectified signals. In the Figures, (f) and (j) show an H.SW signal. Shown in (g) and (k) are the signals produced by detecting and rectifying the waveforms in (b) and (c) of FIG. 8. The signals in (g) and (k) show the waveforms resulting from the detection and rectification at the same potential (e.g., the zero crossing potential). In this case, the differential potential indicated at 2001 is due to the difference in height between the heads and it corresponds to the value indicated at 803 in (d) of FIG. 8. The signal shown in (h) of FIG. 20 shows the waveform produced by combining the detected and rectified signal shown in (g) and the bias potential shown at 2002. As will be seen from the waveforms shown in (h) and (i), the addition of the bias potential eliminates the level variation due to the head height difference and it is possible to extract only the amount of variation of each detected and rectified signal from the potential indicated at 2003. As already explained in connection with (d) of FIG. 8, the head height difference is generated as the average value of the level comparison circuit outputs during the fields as shown at 803 and the tracking deviation is generated as the level difference between the level comparison circuit output signals during the fields as shown at 801. In other words, the values at 801 and 803 can be generated separately. Thus, it is possible to adjust the bias potential 2002 (FIG. 20) in such a manner that the value 803 corresponding to the head height difference is reduced to zero. It is to be noted that with the detected and rectified signals shown in FIGS. 20 and 21, the level difference due to the head height difference is dependent on the relative deviation amounts and deviation directions of the A and B heads. Therefore, there are cases where the signal level shown in (g) becomes greater than the signal level shown in (k) depending on the head height difference. This condition is shown in (i) and (m). In this case, the level difference due to the head height difference can be eliminated by adding a bias potential 2004 which is opposite in polarity to the bias potential 2002. In other words, the problem of the head height difference can be overcome by adding a bias potential to the detected and rectified signal of either one of the $f_H$ and $3f_H$ frequency components.

The second embodiment of the invention will now be described.

Figure 22:
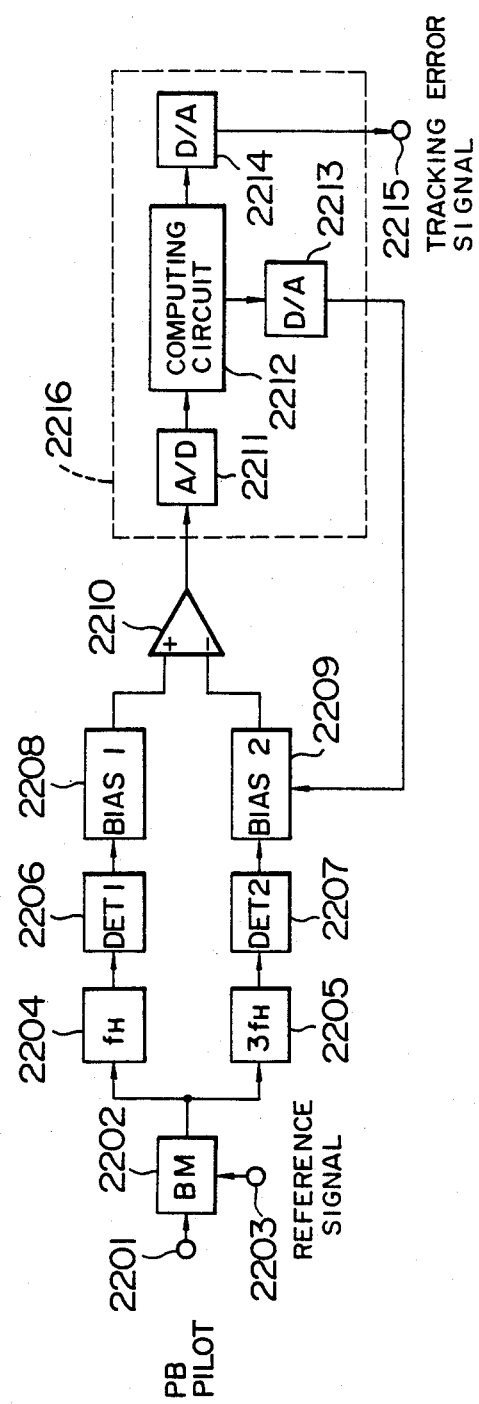
FIG. 22 is a block diagram showing a second embodiment of the invention.

FIG. 22 is a block diagram showing the second embodiment of the invention. In the Figure, the reproduced pilot signal is applied through a terminal 2201 and a reference signal is applied through a terminal 2203. Numeral 2202 designates a balanced modulation circuit, 2204 an $f_H$ tuning circuit, 2205 a $3f_H$ tuning circuit, and 2206 and 2207 detecting and rectifying circuits. The signals and circuit operations of the elements 2201 to 2207 are the same with those already described in connection with FIG. 2. Numerals 2208 and 2209 designate biasing circuits for applying bias potentials. As regards their constructions, it is possible to easily provide a variable biasing circuit by supplying an input signal to either one of the positive and negative terminals of an operational amplifier circuit and varying a potential applied to the other terminal. In FIG. 22, the biasing circuit 2208 is a fixed biasing circuit and the biasing circuit 2209 is a variable biasing circuit. In the case of a VTR involving no head height difference, the bias values of the two circuits are the same. Numeral 2210 designates a level comparison circuit which generates a signal corresponding to the difference in level between the output signals from the biasing circuits 2208 and 2209. When the output signals are the same in level, the level comparison circuit 2210 generates a potential of $\frac{1}{2}$ Vcc, for example. Numeral 2211 designates an A/D converter, 2213 and 2214 D/A converters, and 2212 a computing circuit. The computing circuit 2212 computes so that the output signals generated from the level comparison circuit during the respective head scanning periods are extracted in a time division manner and the level difference between at least two extracted signals is computed and subjected to D/A conversion by the D/A converter 2214 thereby producing a tracking error signal and the computing circuit 2212 also computes the amount of deviation of the average value of the at least two extracted signals from a reference signal (e.g., $\frac{1}{2}$ Vcc). This deviation is supplied to the biasing circuit 2209 through the D/A converter 2213. As already explained in connection with the description of the principle of the invention, the biasing circuit 2209 functions so that the bias value to be added to the detected and rectified signal is varied in accordance with the deviation and the level difference between the detected and rectified signals due to the head eight difference is eliminated. The block 2216 enclosed by the broken line can be formed with a microcomputer and therefore the processing of the computing circuit 2212 can also be effected by the use of software.

A specific example of the computational operations of the computing circuit 2212 will now be described.

Figure 23:
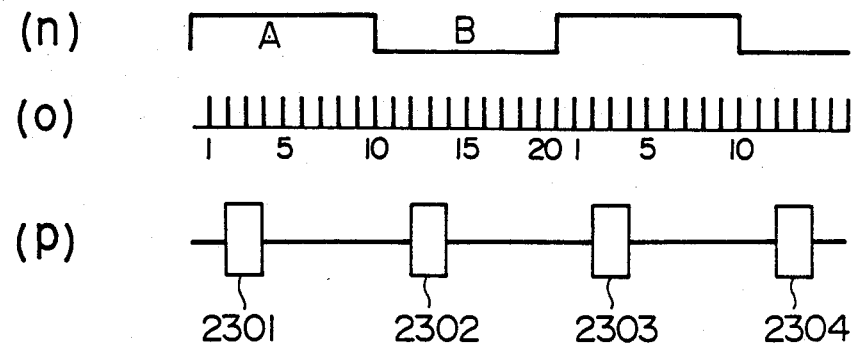
FIG. 23 parts (n)–(p), are a timing diagram of the timer interruption routine in the second embodiment.

FIG. 23 illustrates a plurality of waveforms useful for explaining the software processing that will be described later with (n) showing an H.SW signal, (o) a timing of timer interrupts and the number of interrupts and (p) the signals resulting from the reproduction of the third track for use as multitrack PCM signals.

The software processing will be described with reference to FIGS. 24 and 25.

Figure 24:
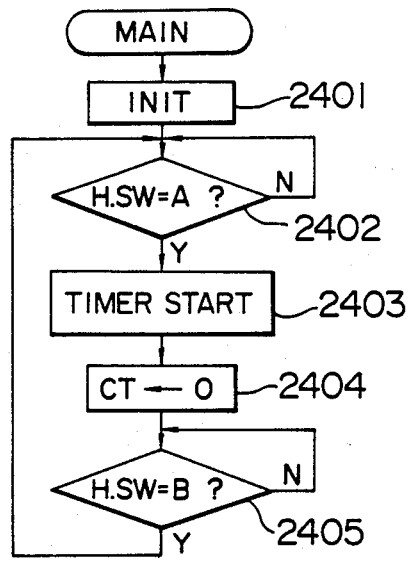
FIG. 24 is a flow chart of a main routine for explaining the operation of the second embodiment.

FIG. 24 is a flow chart showing the processing of a main routine. In the Figure, at an initilize step 2401, an initializing operation of clearing the RAMs, setting an initial value of a tracking error signal and an initial value of bias potentials, etc., is performed. At a step 2402, a decision is made so that if the H.SW signal is at the A head scanning period, a step 2403 and the following are performed. If it is not, the processing is held in a wait state. The step 2403 is in fact performed upon change of the H.SW signal from the B head scanning period to the A head scanning period. At the step 2403, the internal timer is started. While the timer time may be selected as desired, it is selected to have a value so that each frame is divided for example into 20 parts as shown in (o) of FIG. 23. At a step 2404, the RAM designated as CT is cleared. At a step 2405, the processing is placed in a wait state until the H.SW signal comes to the B head scanning period and a transfer is made to the step 2402 when the B head scanning period is arrived. The main routine comprises these steps.

Figure 25:
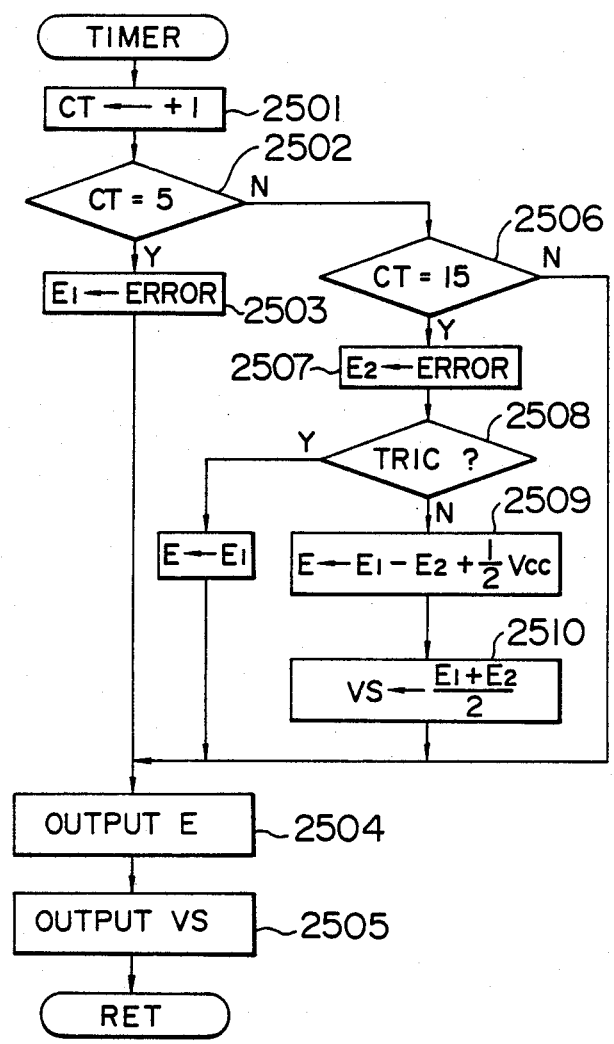
FIG. 25 is a flow chart of a timer interruption routine for explaining the operation of the second embodiment.

When a timer interrupt is caused when the processing of the main routine is being executed, the interrupt routine shown in FIG. 25 is executed. In the Figure, at a time 2501, the content of the RAM designated as CT is increased by 1 and thus the CT stores the number of timer interrupts. At a step 2502, a decision is made so that if the value of CT is 5, a transfer is made to a step 2503. If it is not, a transfer is made to a step 2506. At the step 2503, the output of the level comparison circuit at that time is read and stored in the RAM designated as $E_1$. At a step 2504, the value of the RAM designated as E and storing the value of the tracking error signal is generated. At a step 2505, the value of the RAM designated as VS and storing the bias potential value is generated. At the beginning, e.g., at the time of connecting the power source, the initial values set in the E and VS at the step 2401 (FIG. 24) are generated. If the value of CT is not 5, a decision is made at the step 2506 so that if the value of CT is 15, a step 2507 and the following are performed. If the value of CT is not 15, a transfer is made to the step 2504. At the step 2507, the output of the level comparison circuit at that time is read and stored in the RAM designated as $E_2$. At a step 2508, it is determined whether the reproduction is the ordinary reproduction mode where the recording tape speed and the reproducing tape speed are the same or a special reproduction (tric) mode. In the case of the ordinary reproduction mode, a step 2509 and the following are performed. In the case of the tric mode, a transfer is made to a step 2511. At the step 2509, the value of $\frac{1}{2}$ Vcc is added to the difference between the values in $E_1$ and $E_2$ and the result is stored in the RAM designated as E. In other words, the value of the tracking error signal is renewed at the step 2509. At a step 2510 the value of the bias potential is computed and the new bias potential value is stored in the RAM designated as VS. As shown at the step 2510, the bias potential value is half the sum of the values in the $E_1$ and $E_2$ and it is equal to the value of $\frac{1}{2}$ Vcc if there is no head height difference. Note that depending on the construction of the biasing circuit 2209 (FIG. 22) to which the bias potential is added, it is possible to generate only the amount of change as the value of the bias potential VS. In this case, the value of VS is equal to the half value of the sum of the values of $E_1$ and $E_2$ minus the reference potential (e.g., $\frac{1}{2}$ Vcc). After the step 2510 has been performed, a transfer is made to the step 2504. In the tric mode, the step 2511 is performed and the significance of this step will be described later in detail.

The CT values of 5 and 15 shown at the steps 2502 and 2506 indicate the sampling position. As will be seen from FIG. 23, the positions of the CT values of 5 and 15 are selected at the centers of the respective head scanning periods and these CT values are proper in the case of the ordinary VTR for the recording and reproduction of video signals. In the case of an 8 mm VTR, however, it is conceived to divide the video signal recording track area into 5 parts and record and reproduce only time-compressed PCM audio signals. In this case, the reproduced PCM signals are for example produced at portions designated at 2301 to 2304 in (p) of FIG. 23. As a result, the output signal of the level comparison circuit attains the normal value only at these reproduced portions. Even in the case of a VTR of the type which records and reproduce only PCM signals, in accordance with the invention it is only necessary to change the condition values of 5 and 15 at the steps 2502 and 2506. For example, it is necessary to change the values to 3 and 13, respectively, in the case of FIG. 23.

The operation in the tric mode will now be described.

Variations in the output of the level comparison circuit in the tric mode will be described first.

Figure 26:
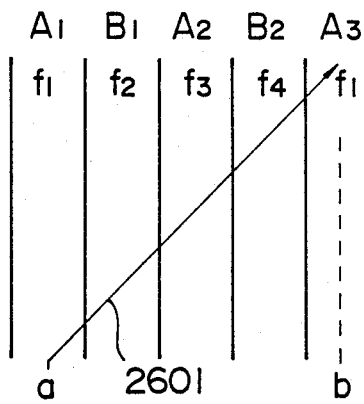
FIG. 26 illustrates the recording tracks and a head scanning pattern during 5× normal speed reproduction.
Figure 27:
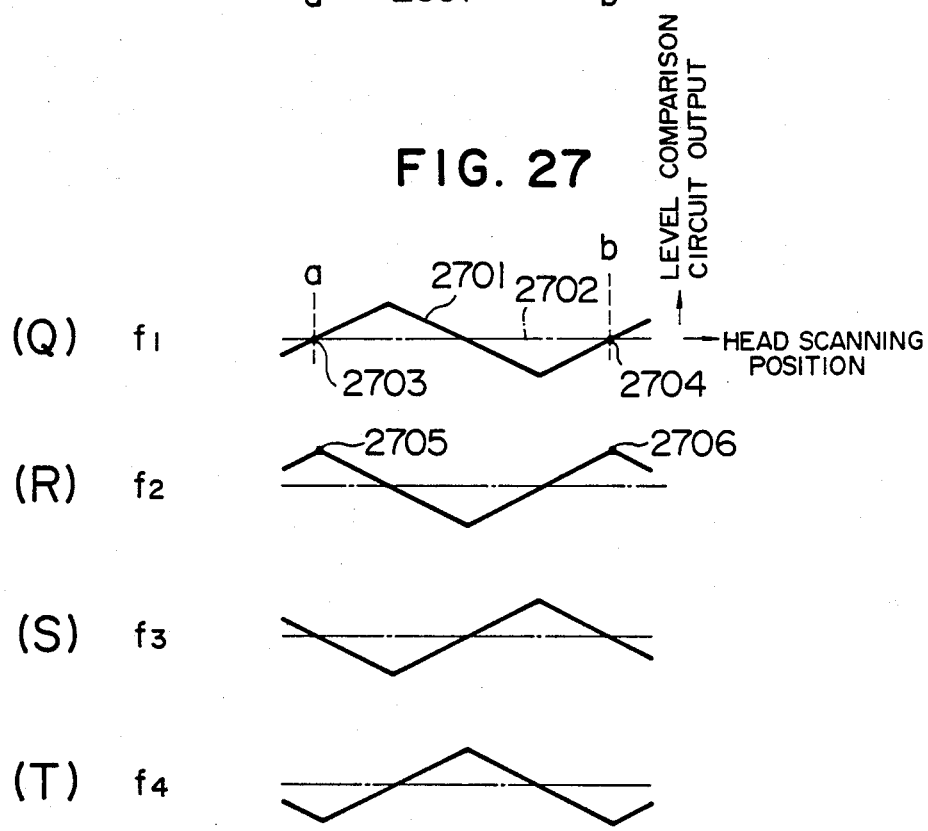
FIG. 27, parts (Q)–(T), show the relation between the head scanning positions and the level comparison circuit output when the reference signal is fixed.

FIG. 26 shows a recorded magnetization pattern and an arrow 2601 shows a head scanning pattern in the 5× normal speed reproduction mode. FIG. 27 shows the relation between the head scanning position and the variation in the output of the level comparison circuit. The head scanning positions shown in FIG. 27 are depicted on the same scale so as to correspond to the positions of the heads scanning the magnetization pattern shown in FIG. 26. The waveforms shown in (Q), (R), (S) and (T) of FIG. 27 show the level variations when the reference signal applied to the balanced modulation circuit is set to $f_1$, $f_2$, $f_3$ and $f_4$, respectively. The signals resulting from the detection and rectification of $f_H$ and $3f_H$ components vary in response to a track deviation in such a manner that if one of the signals is increased, the other signal is decreased. Thus, by examining the variation in either one of the signals, it is possible to know the variation in the output of the level comparison circuit. With the present embodiment, the operation will be described by taking the case of the variation in the $f_H$ component signal.

The output variation of the level comparison circuit when the reference signal is set to $f_1$, that is, the signal shown in (Q) of FIG. 27 will now be described with reference to FIGS. 26 and 27. When the head is positioned at the center of the $A_1$ track, that is, in the position designated at 2703, the potential is an on-track potential (corresponding to the reproduced level of $f_H$). The reproduced level of $f_H$ is maximum when the head is positioned at the center of the $B_1$ track and the reproduced level of $f_H$ is minimum when the head is positioned at the center of the $B_2$ track. Thus, when the reference signal is set to $f_1$, the output variation of the level comparison circuit in response to the head scanning positions is as shown in (Q) of FIG. 27.

Similarly, when the reference signal is set to $f_2$, the reproduced level of $f_H$ is maximum when the head is positioned at the center of the $A_1$ track and it is minimum when the head is positioned at the center of the $A_2$ track. Thus, it will be seen that the signal shown in (R) of FIG. 27 results. On the basis of the same concept, it will be seen that the signals shown in (S) and (T) of FIG. 27 result when the reference signal is set to $f_3$ and $f_4$, respectively.

In the 5× normal speed reproduction mode, the head scanning results for example in a scanning pattern indicated at 2601. The time required for the heads to complete the scanning from the $A_1$ track to the $A_3$ track is equal to one field period (1/60 seconds according to the NTSC system). In this case, if the reference signal is set to $f_1$, the output of the level comparison circuit shows a level variation between points 2703 and 2704. If the reference signal is set to $f_2$, it shows a level variation between points 2705 and 2706. From this fact it is possible to estimate the output variation of the level comparison circuit in an arbitrary N× normal speed reproduction mode.

Figure 7:
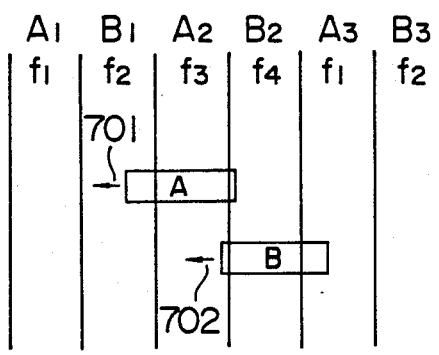
FIG. 7 is a diagram showing the relation between the heads having different heights and the recording track positions.
Figure 28:
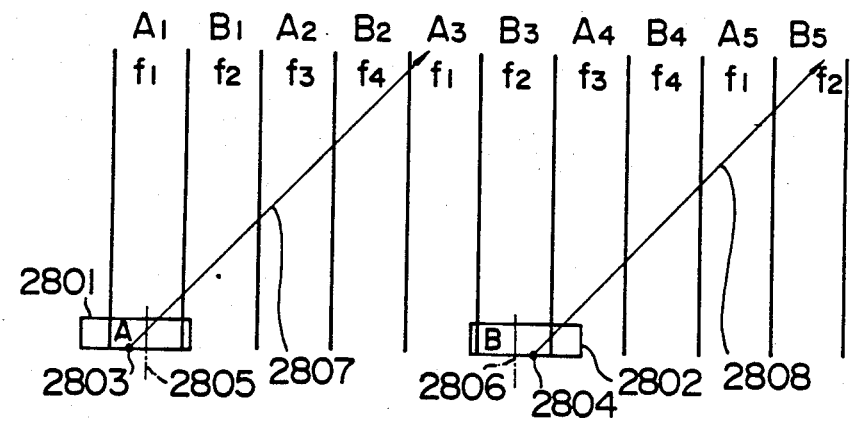
FIG. 28 is a diagram showing the head scanning patterns during the 5× normal speed reproduction by the heads having different head heights.

FIG. 28 shows a head scanning pattern resulting from the 5× normal speed reproduction by the heads involving a head height difference. In the Figure, numerals 2801 and 2802 designate respectively an A head and a B head and they are depicted as involving the same head height difference as the heads previously described in connection with FIG. 7. In other words, there is shown a condition in which a width-direction center 2803 of the A head is deviated to the left from a center 2805 of the recording track on the paper plane and a width-direction center 2804 of the B head is deviated to the right from a center 2806 of the recording track on the paper plane. Numerals 2807 and 2809 designate the scanning patterns of the center points of the heads during the 5× normal speed reproduction.

Figure 29:
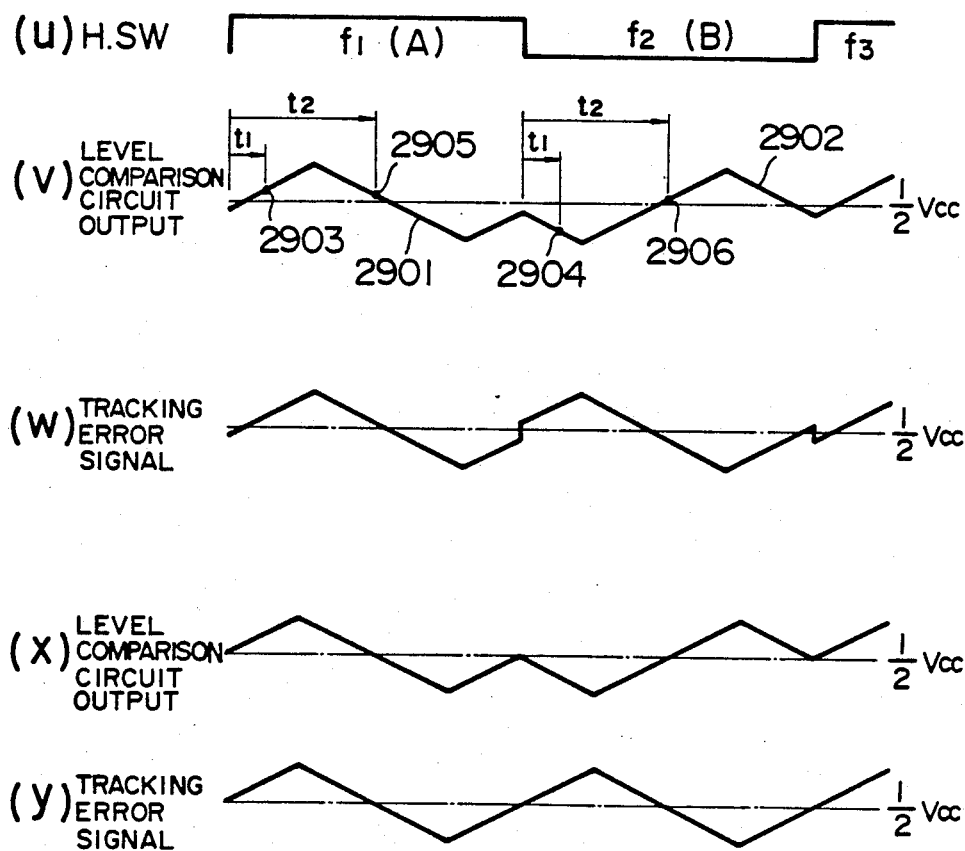
FIG. 29, parts (u)–(y), illustrate the signal waveforms generated at the various parts in the condition shown in FIG. 28.

Shown in (v) and (w) of FIG. 29 are the output of the level comparison circuit in the condition shown in FIG. 28 and the tracking error signal according to the conventional method. In the Figure, (u) shows an H.SW signal, (v) the output signal of the level comparison circuit, and (w) the tracking error signal according to the conventional method produced by inverting the polarity of the output signal of the level comparison circuit obtained during the B head scanning periods with respect to the ½ Vcc level. The signals shown in (x) and (y) are the level comparison circuit output and the tracking error signal resulting from the 5× normal speed reproduction by the heads involving no head height difference. Note that symbols $f_1$, $f_2$ and $f_3$ fixed to the H.SW signal shown in (u) designate the reference signals used during the respective head scanning periods and symbols A and B designate the scanning heads.

Since the reference signal is $f_1$ and the pilot signal recorded on the track at the beginning of the scanning is $f_1$, the signal generated during the A head scanning period as shown in (v) of FIG. 29 can be depicted on the basis of the signal shown in (Q) of FIG. 27. In this case, the center of the A head is deviated to the left on the paper plane and therefore the signal has a signal waveform produced when the scanning positions 2703 and 2704 shown in FIG. 27 are correspondingly shifted to the left. The signal 2902 during the B head scanning period can be depicted in the like manner. The signal shown in (w) is the one obtained by inverting the polarity of the signal produced during the B head scanning period with respect to the ½ Vcc level.

During the quick-mode reproduction such as the 5× normal speed reproduction, if the track recorded by the head different in azimuth angle from the scanning head is scanned, no reproduced signal is obtained and thus a noise bar is produced on the screen. During the quick-mode reproduction, methods are used to cause the noise bar to stand still on the screen and make the picture easy to view. For example, one known method performs the tracking control in such a manner that the number of interesting points with the ½ Vcc level of the tracking error signal shown in (w) and (y) of FIG. 29 attains a predetermined number within a given period of time (e.g., one frame period). As will be seen from the waveforms in (w) and (y) of FIG. 29, the number of intersecting points differs between the case involving a head height difference and the case involving no head height difference and therefore the above-mentioned control method cannot be used. While other methods of causing a noise bar to stand still during the high speed reproduction are conceivable, considering the slow motion reproduction and other processes employing a tracking error signal, allowing the effect of the head height difference to appear on the tracking error signal is not desirable in any case. Thus, it is necessary to eliminate any level variation due to a head height difference even during the quick-mode reproduction.

Then, the previously mentioned method, i.e., the method of extracting the output values of the level comparison circuit during the head scanning periods and varying the bias potential in accordance with the average value of the extracted values cannot be applied to the quick-mode reproduction. This point will now be described.

In (v) of FIG. 29, times $t_1$ and $t_2$ show given periods of time from each edge of the H.SW signal. At the time $t_1$, the average DC potential of the output values 2903 and 2904 of the level comparison circuit has a lower value (below on the paper plane) than the ½ Vcc potential as will be seen from the Figure. On the other hand, at the time $t_2$, the average DC potential of the output values 2905 and 2906 of the level comparison circuit attains a higher value than the ½ Vcc level. In other words, the average DC level varies depending on the sampling positions of the output values of the level comparison circuit and therefore it is not desirable to vary the bias potential by using the average DC level obtained at that time. Thus, in the special reproduction or tric mode, it is necessary to maintain the bias potential correction value used in the ordinary reproduction mode.

Referring again to FIG. 25, the steps 2508 and 2511 show the processing steps in the tric mode. At the step 2508, it is determined whether the reproduction is the ordinary reproduction or the tric reproduction so that if it is the tric reproduction, a transfer is made to the step 2511. At the step 2511, a potential $E_1$ obtained by sampling the level comparison circuit output during the A head scanning period at a given elapsed time from the edge of the H.SW signal is stored in the RAM designated as E for tracking error signal storing purposes. This method is so designed that as for example, the potential 2905 obtained at the expiration of the time $t_2$ in FIG. 29 is utilized as a tracking error signal. If the position of the noise bar in the reproduced signal is not brought to rest, the relative positions in time of the signals shown in (u) and (v) of FIG. 29 are changed. Thus, the output level of the level comparison circuit sampled at a position after the given time $t_2$ also varies depending on the position of the noise bar. Thus, by maintaining constant the potential sampled at the expiration of the time $t_2$, it is possible to cause the position of the noise bar to stand still on the screen.

In the tric mode, the step 2510 shown in FIG. 25 is not performed. In other words, the value of the correction amount VS obtained before the tric reproduction is generated at the step 2505.

It is to be noted that while the method of varying the bias value of either one of the bias potentials has been described, both of the bias potentials may be varied if the occasion demand.

From the foregoing description it will be seen that in accordance with the invention, by virtue of the elimination of a level variation of a tracking error signal due to the difference in height between the heads, there is the advantage of preventing any variation in the speed of the capstan motor and realizing an accurate magnetic tape movement.

There is another advantage that by utilizing the correction value used during the ordinary reproduction to eliminate the ill effect caused by the head height difference during a tric reproduction, it is possible to produce a tracking error signal corresponding only to a track deviation amount.

We claim:

1. A circuit for reproducing information signals and four different tracking control pilot signals recorded on respective tracks on a magnetic tape and producing from the pilot signals a tracking error signal indicative of a relative positional deviation between each of a plurality of magnetic heads and each track of the tape, the circuit comprising:
    means for successively multiplying reproductions of the pilot signals and a reference signal to produce a multiplication output signal having components corresponding to the respective pilot signals;
    means for deriving from the multiplication output signal first and second signals having different frequency component and corresponding to different ones of the pilot signals, the first signals having level A and the second signals having level B;
    means for comparing the level A of the first signal and the level B of the second signal to produce a level-compared output signal whose value is proportional to A minus B and not alternately A minus B and B minus A, the level-compared output signal having respective portions corresponding to successive periods of reproducing signals on tracks on which different ones of the pilot signals are recorded;
    means for time-divisionally extracting the values of the level-compared output signal during the periods of reproducing signals recorded on the tracks when the tracks have recorded thereon different ones of said pilot signals; and
    means for calculating the values of differences between at least two of the extracted level values to produce the tracking error signal.

2. A circuit for reproducing information signals and four different tracking control pilot signals recorded at a tape speed on respective tracks on a magnetic tape and producing from the pilot signals a tracking error signal indicative of a relative positional deviation between each of a plurality of magnetic heads and each track of the tape, the circuit comprising:
    means for successively multiplying reproductions of the pilot signals and a reference signal to produce a multiplication output signal;
    means for deriving from the multiplication output signal first and second signals having different frequency components and corresponding to different ones of the pilot signals;
    means for detecting and rectifying the first and second signals;
    means for biasing the detected and rectified first and second signals by adding bias potentials thereto;
    means for comparing levels of the biased first and second signals to produce a level-compared output signal whose level is indicative of the relative levels of the biased first and second signals, the level-compared output signal having respective portions corresponding to successive periods of reproducing signals on tracks on which different ones of the pilot signals are recorded;
    means for time-divisionally extracting the values of levels of the level-compared output signal during the periods of reproducing signals recorded on the tracks when the tracks have recorded thereon different ones of the pilot signals, thereby to produce extracted level data; and
    means for averaging the extracted level data and varying one of the bias potentials in accordance with the averaged data.

3. A circuit as in claim 2, further comprising for a special reproduction mode using a tape speed different from that used for recording, means for maintaining bias values determined in an ordinary reproduction mode.

4. A circuit for reproducing information signals and four different tracking control pilot signals recorded on respective tracks on a magnetic tape and producing from the pilot signals a tracking error signal indicative of a relative positional deviation between each of a plurality of magnetic heads and each track of the tape, the circuit comprising:

means for successively multiplying reproductions of the pilot signals and a reference signal to produce a multiplication output signal having components corresponding to the respective pilot signals;

means for deriving from the multiplication output signal first and second signals having different frequency components and corresponding to different ones of the pilot signals;

means for comparing the first and second signals in level to produce at an output thereof a level-compared output signal whose value is indicative of the relative levels of the first and second signals, the level-compared output signal having a respective portions corresponding to successive periods of reproducing signals on tracks on which different ones of the pilot signals are recorded;

means, directly connected to said output of said comparing means, for time-divisionally extracting the values of levels of the level-compared output signal during the periods of reproducing signals recorded on the tracks when the tracks have recorded thereon different ones of said pilot signals; and means for calculating the values of differences between at least two of the extracted level values to produce the tracking error signal.

* * * * *